United States Patent
Tittlebaum et al.

[11] Patent Number: 6,099,722
[45] Date of Patent: *Aug. 8, 2000

[54] AEROBIC WASTEWATER TREATMENT SYSTEM FOR SMALL FLOWS

[76] Inventors: Marty E. Tittlebaum, 6715 Canal Blvd., New Orleans, La. 70124; Grady A. Tucker, Jr., 118 Bent Creek Dr., Brandon, Miss. 39042

[*] Notice: This patent is subject to a terminal disclaimer.

[21] Appl. No.: 08/950,883

[22] Filed: Oct. 15, 1997

[51] Int. Cl.[7] .................................................. C02F 3/12
[52] U.S. Cl. ...................... 210/86; 210/195.4; 210/207; 210/320; 210/532.2
[58] Field of Search .............................. 210/86, 138, 139, 210/170, 195.3, 195.4, 197, 205, 207, 270, 320, 532.2

[56] References Cited

U.S. PATENT DOCUMENTS

| | | | |
|---|---|---|---|
| 2,897,186 | 6/1959 | Burgoon et al. | 210/197 |
| 3,627,135 | 12/1971 | Goodman | 210/195.4 |
| 3,805,957 | 4/1974 | Oldham et al. | 210/195.4 |
| 4,093,549 | 6/1978 | Wilson | 210/197 |
| 4,664,795 | 5/1987 | Stegall et al. | 210/202 |
| 4,834,879 | 5/1989 | Stegall et al. | 210/205 |
| 5,061,369 | 10/1991 | Romero et al. | 210/532.2 |
| 5,316,668 | 5/1994 | Tang | 210/195.4 |
| 5,451,316 | 9/1995 | Allen | 210/195.4 |
| 5,895,566 | 4/1999 | Tittlebaum et al. | 210/86 |

*Primary Examiner*—Thomas G. Wyse
*Attorney, Agent, or Firm*—Warner J. Delaune, Jr.

[57] ABSTRACT

A self-contained wastewater treatment system is provided, comprising a vessel having a bottom, side walls and a lid defining a hollow interior for containing wastewater, the vessel being adapted for installation underground; an influent line; an effluent line; and a baffle disposed within the interior, generally between the influent line and the effluent line and extending transversely toward opposing side walls of the vessel. The baffle includes a bottom edge separated by a predetermined distance from the bottom of the vessel to define a flow opening. The position of the baffle defines an upstream aeration chamber and a downstream clarifier chamber within the vessel. The side walls include a downstream end wall, the downstream end wall having a lower inclined wall which intersects the bottom of the vessel adjacent the flow opening. Also included are aeration means for producing aeration within the aeration chamber, positioned to produce a generally circular flow path within the aeration chamber, the circular flow path having a flow path component adjacent the flow opening with a flow direction generally away from the clarifier chamber. The vessel also includes a solids removal device operatively disposed between the aeration chamber and the clarifier chamber for drawing solids in the wastewater within the clarifier chamber and transferring the solids back into the aeration chamber.

12 Claims, 3 Drawing Sheets

AEROBIC WASTEWATER TREATMENT SYSTEM FOR SMALL FLOWS

BACKGROUND OF THE INVENTION

I. Field of the Invention

The present invention relates to wastewater systems, and especially to those wastewater treatment systems which are packaged, containerized units.

II. Description of Prior Art

In the treatment of wastewater, there is often utilized a containerized or packaged unit treatment plant which treats received wastewater on an intermittent or small flow basis, such as from a home, small apartment building, or the like. In the home construction industry, for example, a buried, subsoil sewage treatment vessel or septic tank is often used for primary treatment of wastewater. Such sewage treatment devices usually receive flow intermittently and at low hydraulic loading rates and must treat the intermittent flow to meet environmental and health standards. Oftentimes, the unit is merely a holding or "septic" tank that removes settleable solid waste from the wastewater stream.

It is desirable that wastewater be treated in an economical way using as little energy as possible and as few moving parts as possible, while removing a high percentage of solid material from the wastewater stream, and while lowering the chemical oxygen demand (COD) and the biochemical oxygen demand (BOD) of the wastewater stream. It is desired that a minimum of sludge removal would be required since sludge disposal presents an extra problem.

Waste material entering the unit is normally heterogeneous in nature, containing solid waste material as well as liquid wastewater. It is desirable that a wastewater treatment apparatus produce a total homogenation of the fluids received from the waste stream so that they may be properly biodegraded.

In aerated treatment systems, there is often a problem of clogging of the aeration assembly, or diffuser, which provides oxygen and mixing to the unit. Such clogging will cause a degeneration of the treatment process or possibly a total stoppage of air flow to the vessel, converting the process conditions from aerobic to anaerobic, thus removing most of the treatment capability. Also, some aeration assemblies are prone to movement within the vessel, due to the particular design of the assembly and the flexibility of the piping used in construction. Movement of the aeration assembly is unwanted for two primary reasons. First, the upward flow of bubbles should be directly underneath the influent line so that all incoming wastewater will be immediately subject to aeration. Second, the upward flow of bubbles should be kept close to the influent wall of the vessel so that the desired circular flow is maintained. Therefore, it is desirable that an aeration unit or diffuser be provided that minimizes or prevents clogging by solid material entering the unit or microbial mass produced by the unit, and that is prevented from movement away from the side wall adjacent the influent line.

Perhaps the most troublesome problems encountered by prior art systems, however, are those pertaining to the accumulation of scum or floating material near the effluent line. For example, the portion of the vessel serving as the clarifier often contains floating material which can escape the treatment system via the effluent line along with clarified liquid. Ideally, such solids should not remain in the clarifier portion at all, but should re-enter the aeration portion of the vessel for further biodegradation. One solution to the problem of effluent solids, as disclosed in U.S. Pat. No. 4,834,879, has been to draw the effluent from below the surface of the liquid, and then directing the effluent through multiple turns in an effort to leave as much suspended solids within the vessel. While that device did serve to reduce the solids within the effluent more effectively than its predecessors, environmental laws are becoming increasingly more strict, requiring even further reductions in the amount of solids leaving such treatment systems.

Therefore, there is still a strong need for an innovative wastewater treatment system which: (1) increases the time that settleable solids spend within the aeration section of the treatment vessel, (2) decreases the amount of solids leaving the treatment vessel, and (3) remains as inexpensive and reliable as comparative systems.

SUMMARY OF THE INVENTION

It is therefore an object of this invention to provide a wastewater treatment system which maximizes the time that settleable solids spend within the aeration portion of the treatment vessel.

It is also an object of this invention to provide a wastewater treatment system which minimizes the amount of solids leaving the treatment vessel through the effluent line.

It is a further object of this invention to provide a wastewater treatment system which includes a superior diffuser assembly that ensures maintenance of the proper circulation within the aeration portion of the treatment vessel.

Yet another object of this invention is to provide a wastewater treatment system which is inexpensive and reliable.

These and other objects and advantages of the present invention will no doubt become apparent to those skilled in the art after having read the following description of the preferred embodiments which are contained in and illustrated by the various drawing figures.

Therefore, in a preferred embodiment, a self-contained wastewater treatment system is provided, comprising a vessel having a bottom, side walls and a lid defining a hollow interior for containing wastewater, the vessel being adapted for installation underground; an influent line positioned at a first upper portion of the vessel for transferring a wastewater stream to the vessel; an effluent line positioned at a second upper portion of the vessel generally opposite the influent line for discharging treated wastewater from the vessel; a baffle disposed within the interior, generally between the influent line and the effluent line and extending transversely toward opposing side walls of the vessel. The baffle also extends upwardly toward the lid and above an operating water surface elevation within the vessel, wherein the baffle includes a bottom edge separated by a predetermined distance from the bottom of the vessel to define a flow opening. The position of the baffle defines an upstream aeration chamber and a downstream clarifier chamber within the vessel. The side walls include a downstream end wall, the downstream end wall having a lower inclined wall which intersects the bottom of the vessel adjacent the flow opening. Also included are aeration means for producing aeration within the aeration chamber, positioned to produce a generally circular flow path within the aeration chamber, the circular flow path having a flow path component adjacent the flow opening with a flow direction generally away from the clarifier chamber. The vessel also includes solids removal means operatively disposed between the aeration chamber and the clarifier chamber for drawing solids in the wastewater within the clarifier chamber and transferring the solids into the aeration chamber.

The wastewater treatment system may further comprise an inclined deflection plate extending from the side wall adjacent the effluent line, the deflection plate being shaped and dimensioned to direct solids toward the solids removal means. Preferably, the deflection plate includes a plurality of holes formed therein to allow accumulated solids to leave the deflection plate.

In a more specific embodiment, the solids removal means comprises a generally U-shaped tube having a suction portion extending into the clarifier chamber and a discharge portion extending into the aeration chamber, and further including a solids removal air line in fluidic communication with the discharge portion wherein air is passed into the discharge portion to create a suction within the suction portion sufficient to collect solids located in the clarifier chamber and transfer the solids to the aeration chamber.

Preferably, the aeration means comprises an air diffuser formed into a horizontal, rectangularly shaped conduit having a plurality of air exit holes formed therein. In order to prevent clogging of the air exit holes, the holes are preferably formed on the sides of the rectangularly shaped conduit.

A solenoid-activated valve is fluidically disposed between the solids removal air line and the aeration means, wherein the valve is selectively actuated to divert air from the aeration means to the solids removal means and vice versa. A timer is also operatively connected to the valve for selectively actuating the valve and diverting air from said aeration means for a predetermined period of time and at a predetermined frequency. Optionally, a float switch is included within the vessel for activating an alarm during a predetermined high water level within the vessel.

The wastewater treatment system may further comprise laundering means adjacent the effluent line for preventing solids from exiting through the effluent line. In a preferred embodiment, the laundering means includes a horizontal conduit having a first and second end, wherein the first and second ends are sealably attached to the vessel, the horizontal conduit forming at least one quiescent zone in the vicinity of the effluent line, and the horizontal conduit being fluidically connected to the effluent line; and weir means, formed as voids in the horizontal conduit, for collecting the treated wastewater from the quiescent zone and transferring the treated wastewater to the effluent line.

DETAILED DESCRIPTION OF THE PREFERRED EMBODIMENTS

Figure 1:
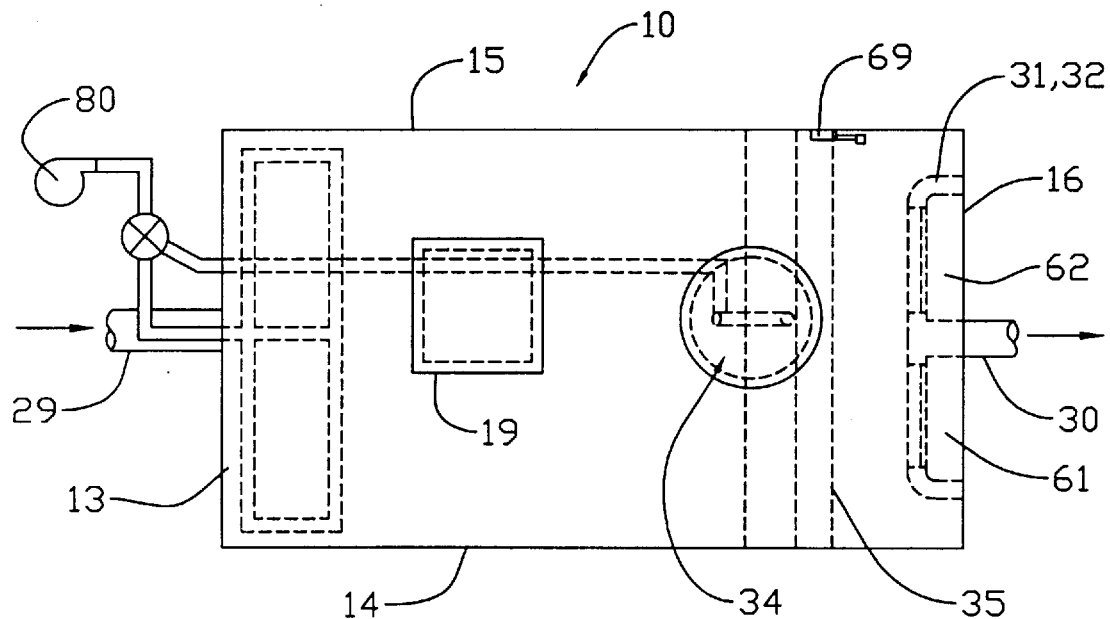
FIG. 1 is a top view of a preferred embodiment of the present invention.

While this invention is susceptible of embodiment in many different forms, there are shown in the drawings and will herein be described in detail preferred embodiments of the invention with the understanding that the present disclosure is to be considered as an exemplification of the principles of the invention and is not intended to limit the invention to the embodiments thus described and illustrated.

The apparatus of the present invention, designated by numeral 10 in the drawings, includes a vessel 11 having a bottom 12 which is preferably rectangular and four upstanding vertical side walls 13–16 which are connected edge-to-edge. A lid 17 forms a sealed closure over the vessel 11 to define an interior 18 which can contain a fluid volume therein. Access hatch 19 allows periodic inspection of the unit for purposes of repair and/or maintenance.

The interior 18 of the vessel 11 comprises a pair of separate chambers including an aeration chamber 21 and a clarifier chamber 22. The aeration chamber 21 and clarifier chamber 22 are defined and separated by an upstanding vertical and transversely extending baffle 23 which is preferably connected at its upper edge 24 to lid 17. The bottom 25 of the baffle 23 is positioned near the bottom 12 of the vessel 11, but does not touch the bottom 12. Baffle 23 preferably forms a continuous seal and connection with side walls 14,15 so that fluid can only flow from one end of vessel 11 to the other under baffle 23 and more particularly under the bottom edge 25 thereof.

Downstream of baffle 23 is an inclined wall 26 which is connected to the bottom 12 of vessel 11 and also to side wall 16. An opening 28 defines a flow zone from aeration chamber 21 and into clarifier 22. Flow opening 28 thus is the relatively small area defined by bottom 25 of baffle 23, and by side walls 14,15 and by the bottom 27 of inclined wall 26.

By positioning the bottom inclined wall 26 adjacent the bottom 25 of baffle 23, a small flow zone is produced. Also, the inclined wall 26 is inclined sufficiently so that solid material cannot collect upon it. A suitable inclination for wall 26 would be at least fifty-three degrees (53°) from horizontal. Thus, any solid matter which might flow through flow opening 28 and into clarifier 22 will settle upon inclined wall 26 and slide downwardly until it reaches the bottom 27 of inclined wall 26. This places any solid material which might enter clarifier 22 back adjacent flow opening 28 so that turbulence created in aeration chamber 21 by diffuser assembly 38 can carry away such solid material back into aeration chamber 21. Arrows 45 illustrate a rolling flow pattern in aeration chamber 21 which creates a flow path component at opening 28 away from clarifier 22. Notice that inclined wall 26 extends fully across vessel 11 between side walls 14,15 and from side wall 16 forwardly to bottom edge 27. Thus, any solid material over the entire horizontal cross-section of clarifier 22 will be channeled back to flow opening 28.

Figure 3:
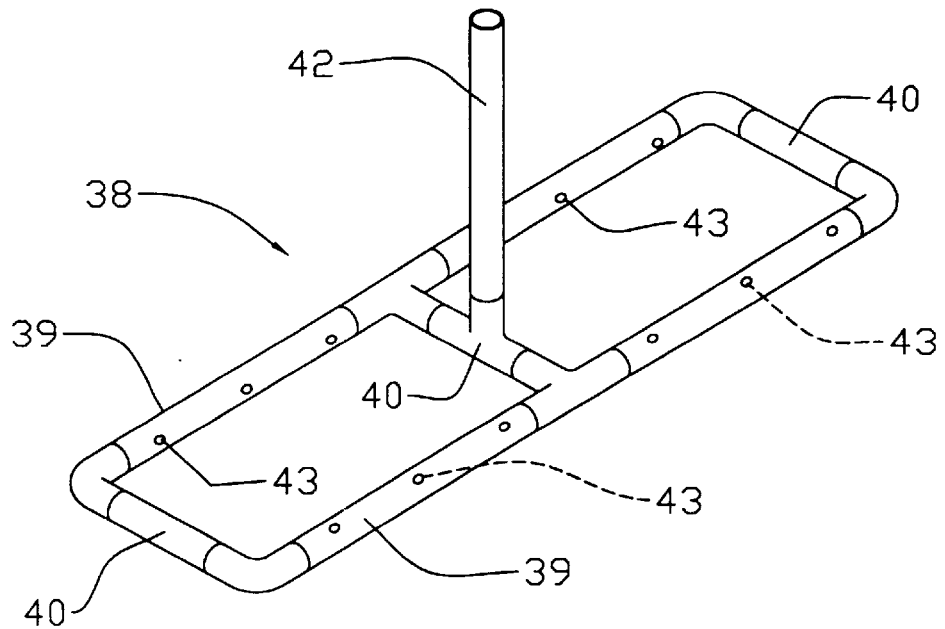
FIG. 3 is a perspective view of the aeration diffuser assembly.

Aeration chamber 21 contains a diffuser assembly 38, shown best in FIG. 3, which is positioned generally under inlet 29 and at the bottom of vessel 11 adjacent side wall 13. Diffuser assembly 38 preferably includes two horizontal and substantially parallel conduits 39 which are fluidically connected to one another via three horizontal conduits 40 oriented perpendicularly to conduits 39 to form a horizontal, rectangularly shaped tubing arrangement. An air line 42 is fluidically connected to one of the longer conduits 39 or to one of the smaller conduits 40, preferably bisecting the width of the diffuser assembly 38, and extends upwardly through the lid 17 and out of vessel 11. Air is pumped through air line 42 by a common compressor 80 located at ground level above the vessel 11. Conduits 39 include a plurality of side openings 43 which can be correspondingly placed and aligned as shown in the drawings. It is important that side openings 43 be placed on the sides of conduits 39, as opposed to the tops or bottoms of conduits 39, so that air bubbles may exit laterally from conduits 39. Prior art diffuser assemblies suffered from frequent clogging of the openings by solids either falling into the openings on the tops of the conduit or closing such openings on the bottoms of the conduit by accumulation of solids at the bottom of the vessel 11. With the hole arrangement described in the present invention, there is less likelihood that settleable solids will clog the openings 43, thus ensuring greater aeration efficiency. Also, the rectangular shape of the diffuser assembly 38, as it rests on the bottom 12 of the vessel 11, prevents it from "walking" away from the side wall 13 during operation. This is a significant advantage over prior art diffusers, because undesirable movement of the diffuser causes an interruption and/or nonuniformity of the necessary continuous flow path 45 within the aeration chamber 21.

Figure 4:
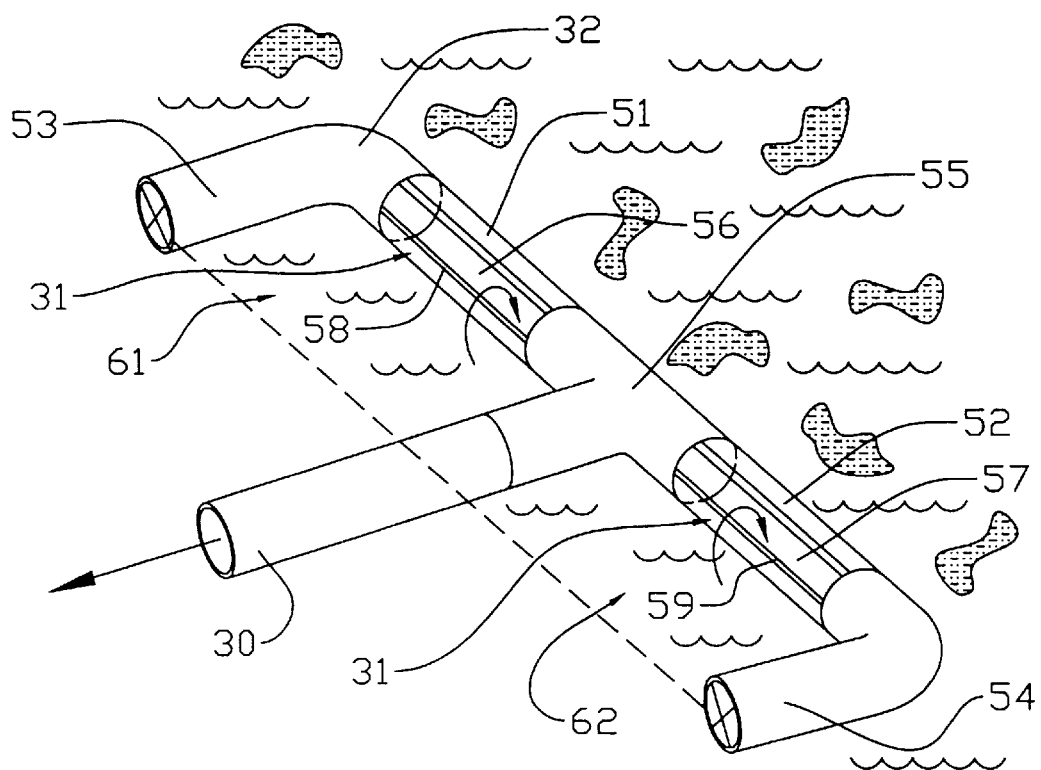
FIG. 4 is a perspective view of a preferred embodiment of the weir and launder assembly leading to the effluent line.

Wastewater enters the aeration chamber 21 through inlet pipe 29 and clarified liquid exits the clarifier 22 through a surface effluent weir 31 and launder 32 to outlet pipe 30. As shown in more detail in FIG. 4, a preferred embodiment of the weir 31 and launder 32 comprises a pair of horizontal pipes 51,52 fluidically connected in perpendicular fashion to the effluent line 30 via a tee section 55, wherein the terminal ends 53,54 of horizontal pipes 51,52, respectively, are sealably attached to the side wall 16 of vessel 11. Notably, horizontal pipes 51,52 and effluent line 30 are at the same height, which is approximately equal to the height of liquid within vessel 11 under normal operating conditions. Each of horizontal pipes 51,52 include cutaway regions or voids 56,57 formed axially to create horizontal weir edges 58,59. As can be seen from FIG. 4, the arrangement of horizontal pipes 51,52, tee section 55 and effluent line 30 define the launder 32 against side wall 16, which establishes a pair of quiescent zones 61,62 which are defined herein as being areas relatively free of the floating solids which may be present on the liquid surface within clarifier 22. It is within these quiescent zones 61,62 that clarified liquid travels over the weir edges 58,59 and through effluent line 30. In this manner, much of the solids that might exist in clarifier 22 are laundered away from the effluent line 30 before clarified liquid crosses weir 31. It should be understood that the weir 31 and launder 32, as specifically disclosed herein, may be effected in a multitude of ways not employing pipes. For example, any structural arrangement which establishes a single quiescent zone prior to passing of the liquid over a weir would be functionally equivalent.

Although the employment of the aforementioned weir 31 and launder 32, by themselves, greatly reduces the escape of solids which are floating at the surface of the liquid in the clarifier 22, some solids will try to rise naturally into the quiescent zones 61,62. To prevent this from occurring, a solids deflection plate 35 is attached to the side wall 16 and extends transversely across the entire width of the vessel 11. The angular orientation of the solids deflection plate 35 redirects rising solids away from the launder 32 and quiescent zones 61,62 so that the launder 32 can be more effective in preventing surface solids from intruding into the quiescent zones 61,62. Preferably, deflection plate 35 includes a plurality of small holes 65 formed close to the point of attachment to side wall 16 so that any solids which may have passed under launder 32 will not be allowed to accumulate on top of deflection plate 35.

In addition to the solids avoidance features of the aforementioned weir 31, launder 32, and deflection plate 35, or possibly even as an alternative thereto, a skimmer assembly 34, or solids removal means, is shown for the purposes of transferring solids from the clarifier 22 back into the aeration chamber 21. Conveniently, the skimmer 34 acts as an air lift pump and may be powered by the same air compressor 80 that operates the diffuser assembly 38, as will be explained in further detail below.

Figure 5:
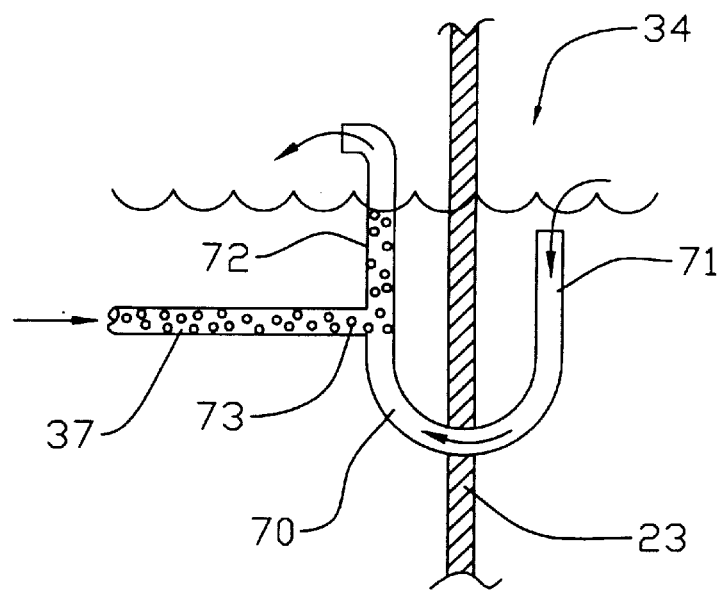
FIG. 5 is a detailed sectional view of the skimmer assembly.

Referring specifically to FIG. 5, the skimmer 34 is constructed from a generally U-shaped pipe 70 which is attached across the baffle 23, wherein the U-shaped pipe 70 includes a suction portion 71 whose terminal end is positioned immediately below the normal operating liquid level within the clarifier 22, as well as a discharge portion 72 whose terminal end is positioned above the normal operating liquid level within the aeration chamber 21. In a preferred embodiment, a skimmer air line 37 is fluidically connected on one end 73 to the discharge portion 72 of the skimmer 34 below the liquid level in the aeration chamber 21. Skimmer air line 37 extends across aeration chamber 21 and is fluidically connected at its opposite end 74 to a 2-way, solenoid-activated valve 36 which is in turn fluidically connected to the diffuser air line 42. Valve 36 is powered by an external power source, such as a 24-volt transformer 67 connected to a conventional 115-volt AC service line 68, and is capable of diverting air flow through diffuser air line 42 entirely to the skimmer air line 37 and vice versa. Thus, the skimmer 34 may be operated for short periods of time to remove floating solids from the clarifier 22 without significantly detracting from the aeration and turbulence created by the diffuser assembly 38.

Under normal operating conditions and for most of the time, air from the external compressor 80 travels through the diffuser air line 42 for operation of the diffuser assembly 38. However, upon actuation of valve 36, air flow ceases through the diffuser air line 42 and travels entirely through the skimmer air line 37. Air bubbles exiting the end 73 of the skimmer air line 37 travel upward through the discharge portion 72 of the skimmer 34, which forces liquid within the U-shaped pipe 70 to move from the clarifier 22 into the aeration chamber 21. The suction created near the surface of the clarifier 22 cause any floating solids to be sucked into the skimmer 34 and deposited back into the aeration chamber 21. By way of example, skimmer 34 may be operated for only about 10 minutes during periods of low flow into the vessel 11, such as late at night. These short-term skimming operations, when performed on a daily basis, drastically reduce the solids present in the clarifier 22, forcing those solids to be further biodegraded.

Skimmer 34 is preferably activated by a simple, low-voltage timer 66 connected to valve 36 which defines the period during which the air will be diverted to skimmer air line 37. The removal of solids from the clarifier 22 by skimmer 34 is further assisted by the presence of the deflection plate 35, previously described herein, which redirects rising solids away from the launder 32 and toward the suction portion 71 of the skimmer 34. Thus, when all of the aforementioned components are employed, the skimmer 34 and deflection plate 35 ensure that the liquid surface within clarifier 22 is free of all floating materials, thereby maximizing the utility of the weir 31 and launder 32. In this manner, only clear, treated supernatant liquid is discharged to the effluent line 30.

Figure 2:
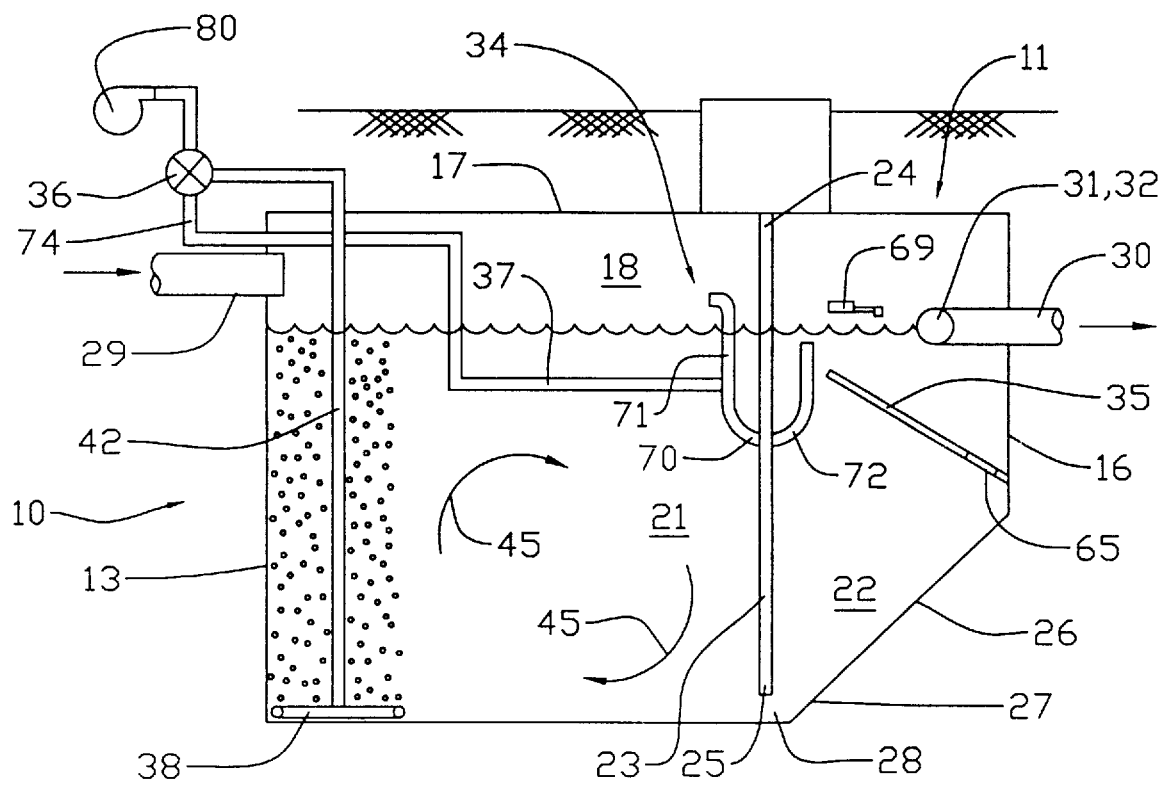
FIG. 2 is a side elevation sectional view of the preferred embodiment of the present invention.
Figure 6:
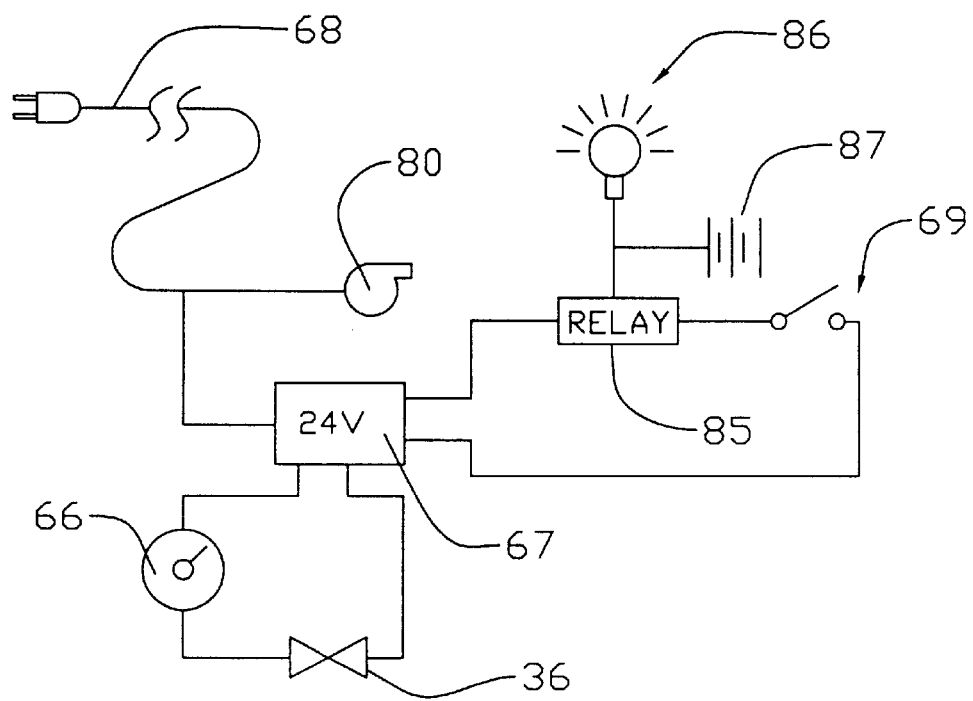
FIG. 6 is a schematic diagram of the electrical connections used in operating the present invention.

Optionally, an alarm system can be implemented to detect flooding conditions within the vessel 11 or a loss of power to the compressor 80. As shown in FIGS. 1 and 2, as well as in the schematic diagram of FIG. 6, a normally closed float switch 69 is affixed within the clarifier 22 just above the normal liquid level. The float switch 69 is connected to the same transformer 67 as described earlier, but with the addition of a normally closed relay 85. When the transformer 67 is energized, the normally closed relay 85 is held open. When the float switch 69 rises, indicating a high water level, the circuit is broken and the relay 85 closes, causing an alarm 86 to activate. The alarm 86 may be any audible and/or visual indication that a high water condition is present, and is independently powered by another power source, such as a battery 87. The activation of alarm 86 also occurs in the event that power is interrupted to the transformer 67.

Thus, the apparatus of the present invention is a paragon of simplicity, yet has been found to be highly efficient in the treatment of wastewater, and superior in terms of minimizing effluent solids in comparison to prior art systems. It is believed that the use of the weir 31, launder 32, and deflection plate 35, even without the use of the skimmer 34, provide significant advantages in treatment efficiency over the prior art. Likewise, it is believed that the use of the skimmer 34, even without the use of the weir 31, launder 32, and deflection plate, provides similar advantages. Therefore, the scope of the present invention should not be viewed as being limited to having each and every one of the aforementioned components. Rather, the invention affords the user to include some or all of the novel features discussed herein to achieve varying ranges of treatment efficiency depending upon resources and the need to comply with any applicable environmental and/or health regulations.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

We claim:

1. A self-contained wastewater treatment system, comprising:
    (a) a vessel having a bottom, side walls and a lid defining a hollow interior for containing wastewater, said vessel being adapted for installation underground;
    (b) an influent line positioned at a first upper portion of said vessel for transferring a wastewater stream to said vessel;
    (c) an effluent line positioned at a second upper portion of said vessel generally opposite said influent line for discharging treated wastewater from said vessel;
    (d) a baffle disposed within said interior, generally between said influent line and said effluent line and extending transversely toward opposing side walls of said vessel, said baffle extending upwardly toward said lid and above an operating water surface elevation within said vessel, wherein said baffle includes a bottom edge separated by a predetermined distance from said bottom of said vessel to define a flow opening, and wherein said baffle defines an upstream aeration chamber and a downstream clarifier chamber within said vessel;
    (e) said side walls including a downstream end wall, said downstream end wall having a lower inclined wall which intersects said bottom of said vessel adjacent said flow opening;
    (f) aeration means for producing aeration within said aeration chamber, positioned to produce a generally circular flow path within said aeration chamber, said circular flow path having a flow path component adjacent said flow opening with a flow direction generally away from said clarifier chamber; and
    (g) solids removal means operatively disposed between said aeration chamber and said clarifier chamber for drawing solids in said wastewater within said clarifier chamber and transferring said solids into said aeration chamber.

2. The wastewater treatment system according to claim 1, further comprising an inclined deflection plate extending from said side wall adjacent said effluent line, said deflection plate being shaped and dimensioned to direct said solids toward said solids removal means.

3. The wastewater treatment system according to claim 2, wherein said deflection plate includes at least one hole formed therein to allow accumulated solids to leave said deflection plate.

4. The wastewater treatment system according to claim 1, wherein said solids removal means comprises a generally U-shaped tube having a suction portion extending into said clarifier chamber and a discharge portion extending into said aeration chamber, and further including a solids removal air line in fluidic communication with said discharge portion wherein air is passed into said discharge portion to create a suction within said suction portion sufficient to collect solids located in said clarifier chamber and transfer said solids to said aeration chamber.

5. The wastewater treatment system according to claim 1, wherein said baffle includes side edges forming a continuous seal with said opposing side walls.

6. The wastewater treatment system according to claim 1, wherein said aeration means comprises an air diffuser formed into a horizontal, rectangularly shaped conduit having a plurality of air exit holes formed therein.

7. The wastewater treatment system according to claim 6, wherein said air exit holes are formed on the sides of said rectangularly shaped conduit.

8. The wastewater treatment system according to claim 4, further comprising a valve fluidically disposed between said solids removal air line and said aeration means, wherein said valve is selectively actuated to divert air from said aeration means to said solids removal means and vice versa.

9. The wastewater treatment system according to claim 8, further comprising a timer operatively connected to said valve for selectively actuating said valve and diverting air from said aeration means for a predetermined period of time and at a predetermined frequency.

10. The wastewater treatment system according to claim 1, further comprising a float switch within said vessel for activating an alarm during a predetermined high water level within said vessel.

11. The wastewater treatment system according to claim 1, further comprising laundering means adjacent said effluent line for preventing said solids from exiting through said effluent line.

12. The wastewater treatment system according to claim 11, wherein said laundering means includes:
    (a) a horizontal conduit having a first and second end, wherein said first and second ends are sealably attached to said vessel, said horizontal conduit forming at least one quiescent zone in the vicinity of said effluent line, and said horizontal conduit being fluidically connected to said effluent line; and
    (b) weir means, formed as voids in said horizontal conduit, for collecting said treated wastewater from said quiescent zone and transferring said treated wastewater to said effluent line.

* * * * *